United States Patent
Zelensky

[15] 3,681,768
[45] Aug. 1, 1972

[54] MAGNETIC ANALOG MEMORY DEVICE

[72] Inventor: Vladimir Alexandrovich Zelensky, Kiev, Union of Soviet Socialist Republics, U.S.S.R.

[73] Assignee: Institut Elektrodinamiki Akademii Nauk, Kiev, U.S.S.R.

[22] Filed: July 28, 1969

[21] Appl. No.: 845,215

[52] U.S. Cl. .......340/174 AN, 340/174 CT, 340/174 AG, 340/174 HA

[51] Int. Cl. ..........................G11c 27/00, G11c 11/08

[58] Field of Search .340/174; 307/88; 179/100.2 CF

[56] References Cited

UNITED STATES PATENTS

| | | | |
|---|---|---|---|
| 2,741,757 | 4/1956 | Devol et al | 340/174 |
| 3,379,895 | 4/1968 | Green | 307/88 |
| 3,373,411 | 3/1968 | James | 340/174 AN |
| 3,533,090 | 10/1970 | Olsen | 340/174 AN |
| 3,225,145 | 12/1965 | Warren | 179/100.2 CF |
| 3,287,712 | 11/1966 | Hewitt | 340/174 |

*Primary Examiner*—Stanley M. Urynowicz, Jr.
*Attorney*—Holman & Stern

[57] ABSTRACT

A magnetic analog memory device comprising a core with control windings and a variable induction transducer or sensing means, in which a higher stability is achieved by making up the core of two open parts, each part carrying a control winding and forming a magnetic circuit with two poles, the first poles of the magnetic circuits being combined, the second poles being separated by a gap accommodating the variable induction transducer.

1 Claim, 1 Drawing Figure

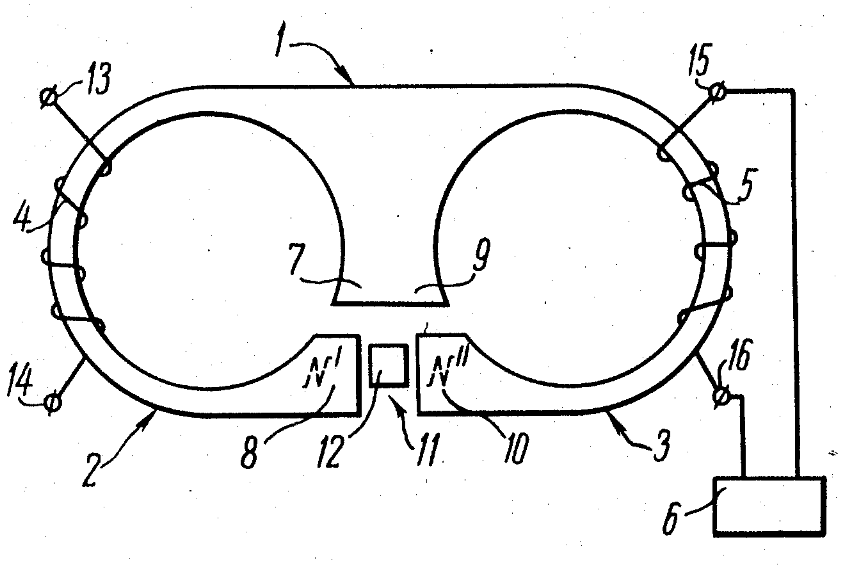
Inventor
VLADIMIR ALEXANDROVITCH ZELENSKY
ATTORNEYS
Holman & Stern

MAGNETIC ANALOG MEMORY DEVICE

The invention relates to memory devices, particularly, to magnetic analog memory devices.

There exist magnetic analog memory devices including a core with control windings and a variable induction transducer located in the core gap (See, for example the USSR Author's Certificate No. 206192, class $42^4{}_m$, 7/08).

The objectionable features of these magnetic analog memory devices are their instability and poor accuracy.

The present invention aims at providing a magnetic analog memory device which ensures a much higher accuracy of measuring the memorized quantity through the compensation measurement of the residual core magnetization and through the use of a variable induction transducer or sensing means in the function of the transmitter of the magnetic field null indicator.

To achieve this and other aims in the magnetic analog memory device which comprises a core with control windings and a sensing means, according to the invention, the core is made up of two open parts, each part carrying a control winding and forming a magnetic circuit with two poles, the first poles of the two circuits being combined while the other two poles are separated by a gap in which the sensing means is accommodated.

Other objects and advantages of the invention will be best understood from the description of one embodiment of the invention given below with reference to the accompanying drawing which shows the schematic of a magnetic analog memory device, according to the invention.

The accompanying drawing shows a general circuit of a magnetic analog memory device according to the present invention.

A core 1 of the magnetic analog memory device is made of a magnetic, preferably retantive, material and consists of two parts 2 and 3, each part forming a magnetic circuit. Each magnetic circuit has a control winding 4 or 5, the latter winding being connected to an adjustable current source 6, and has magnetic poles 7 and 8 for one circuit and 9 and 10 for the other.

The core 1 is designed so that the pole 7 of the first circuit and the circuit 9 of the second pole are combined, while the poles 8 and 10 are separated by a gap 11 in which a sensing means 12 is placed.

The quantities are memorized and the memorized quantities are measured in the following manner. To prepare the device for use a high-amplitude current pulse is applied from an auxiliary source (not shown in the drawing) to terminals 13 and 14 of the winding 4 and terminals 15 and 16 of the winding 5 simultaneously to saturate the core to the maximum magnetization. The windings 4 and 5 are so connected that the free poles 8 and 10 of the two circuits have like polarity, for example, N′ and N″, as shown in the drawing. At such time the circuits are magnetically balanced and there is no magnetic flux in the gap 11.

The signal the value of which is to be memorized is applied to the terminals 13, 14 of the winding 4 in the form of a current signal of the opposite polarity with respect to the current pulse which brings the core 1 to the original state. As a result, the part 2 of the core is subjected to a magnetic polarity reversal, the decrease in the magnetic flux being proportional to the amplitude of the input signal. This upsets the magnetic balance in the gap 11, and a flux appears the magnitude of which is also proportional to the input signal amplitude. The core can remain in this condition for an indefinitely long time.

To measure the memorized quantity the adjustable current source 6 is connected to the terminals 15, 16 of the winding 5 and the part 3 of the core is gradually demagnetized until the circuits are magnetically balanced.

The balancing is checked with the help of the sensing means 12, which, in this case, functions as the null indicator of the magnetic field. The amplitude of the adjustable current fed to the winding 5 at the moment the two circuits are balanced is proportional to the memorized signal. The measurement accuracy depends on how sensitive the sensing means is to the external magnetic field and on the accuracy with which the adjustable current is measured.

To memorize a new quantity the core must be restored to the original magnetic state.

The use of a highly stable and sensitive sensing means 12, which must respond only to the absence of the magnetic field in the gap 11 makes it possible to obtain a simple magnetic analog memory device featuring an accuracy an order of magnitude higher than the accuracy of the existing memory devices, linear transfer characteristics and relatively high memorized quantities.

The memory device can be widely used in automatic control schemes and for registering electrical parameters, such as emergency parameters of power transmission lines.

Though the foregoing description relates to only a preferred embodiment of the invention, it is intended to cover all changes and modifications which do not constitute departures from the spirit and scope of the invention, as can be easily understood by those scilled in the art.

Such changes and modifications are considered within the meaning and scope of the invention as set forth in the appended claims.

What is claimed is:

1. A magnetic analog memory device comprising a branched core of magnetic material having a high residual magnetization, said core defining a first magnetic circuit means for storing analog information in the form of residual magnetization in said first circuit means and a second magnetic circuit means for measuring said analog information by balancing the residual magnetization values in said circuit means, said first circuit means having a first and a second pole and carrying a control winding means for creating a residual magnetization proportional to the value of an input signal in said first circuit means; said second circuit means having a first and a second pole and carrying a control winding means for creating a residual magnetization in said second circuit means which equals the residual magnetization of said first circuit means; said branched core having a configuration wherein said first poles of each of said circuit means are combined and wherein said second poles of each of said circuit means are separated by a gap; and sensing means disposed in said gap which is sensitive to the magnetic field in said gap and serves to control the balancing of the residual magnetization of said circuits at the moment when said analog information is measured.

* * * * *